Dec. 18, 1962 T. LOCK 3,068,799
LIQUID VAPOR PUMP
Original Filed Nov. 3, 1954 4 Sheets-Sheet 1

Inventor:
Thomas Lock
By: Joseph R. Dwyer
Atty.

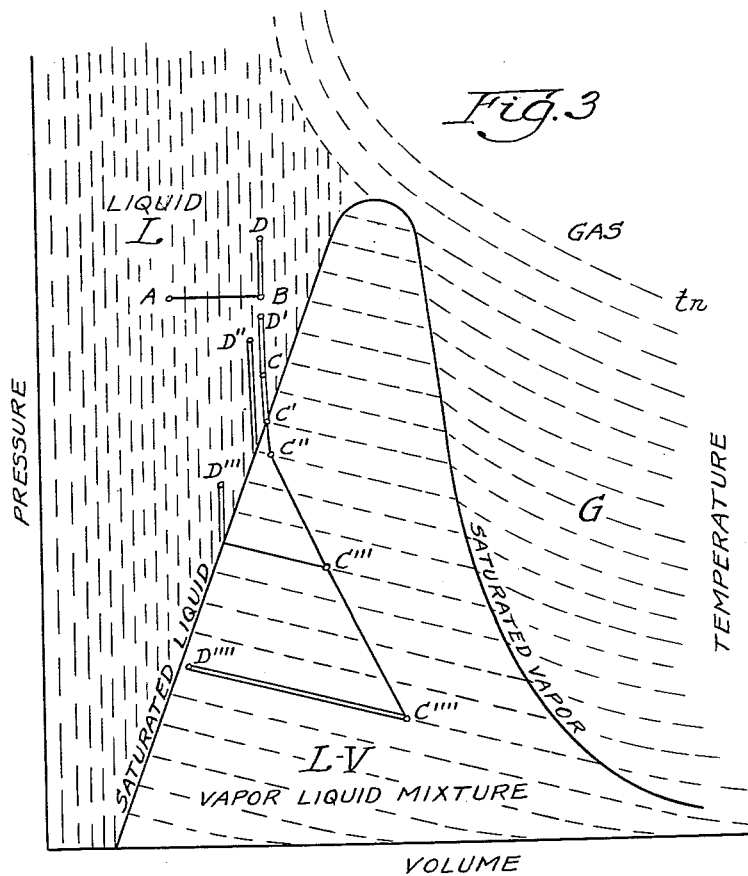
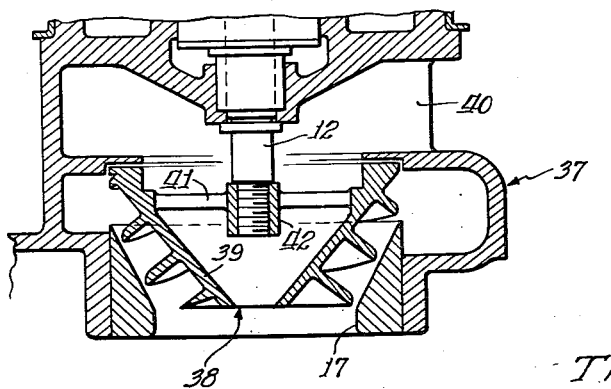

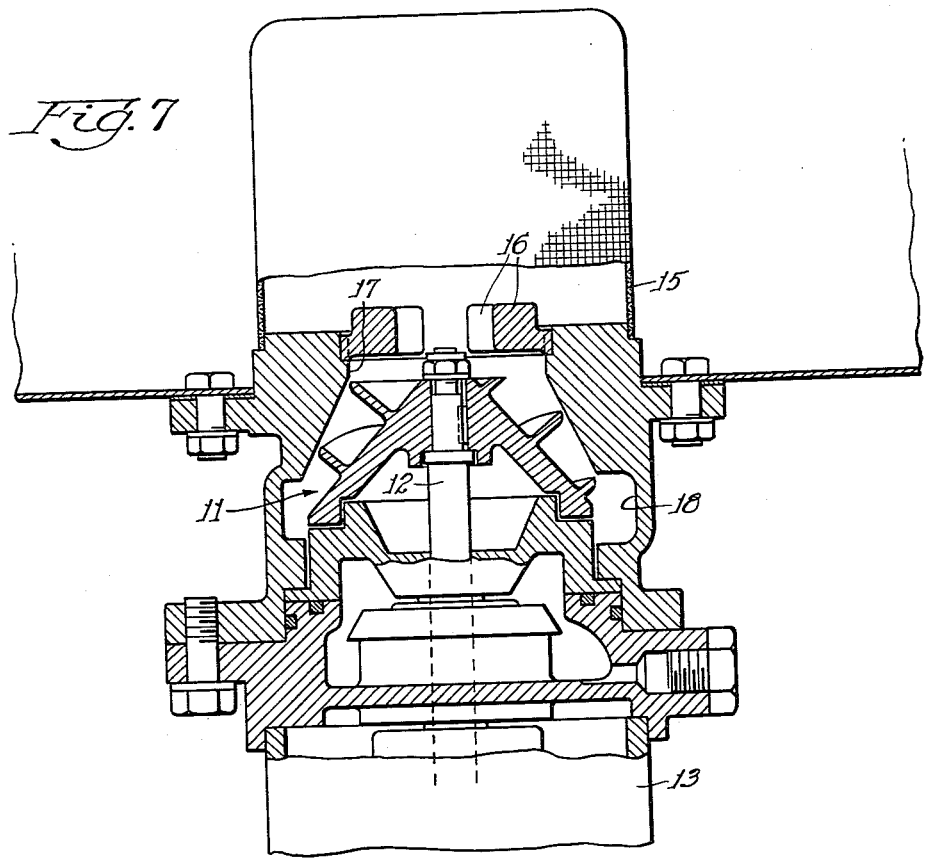
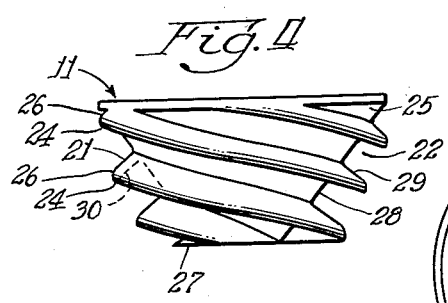
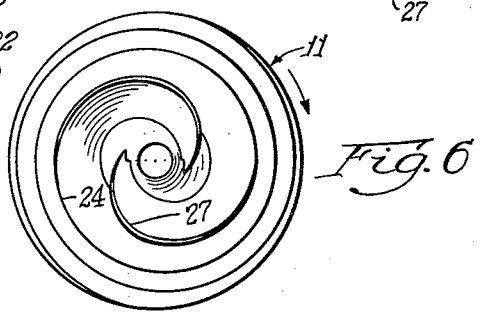
Inventors:
Thomas Lock

Dec. 18, 1962  T. LOCK  3,068,799
LIQUID VAPOR PUMP
Original Filed Nov. 3, 1954  4 Sheets—Sheet 4

Inventor:
Thomas Lock
By: Joseph R Dwyer
Atty.

United States Patent Office 3,068,799
Patented Dec. 18, 1962

3,068,799
LIQUID VAPOR PUMP
Thomas Lock, Parma, Ohio, assignor to Borg-Warner Corporation, Chicago, Ill., a corporation of Illinois
Continuation of application Ser. No. 466,562, Nov. 3, 1954. This application Nov. 28, 1960, Ser. No. 72,836
1 Claim. (Cl. 103—88)

My invention relates in general to the pumping of liquids and is particularly concerned with a new and improved pump and a new and improved method of delivering fuel from aircraft tanks to a point of consumption such as an aircraft carburetor of the engine itself.

My invention in its more general aspects is a new and improved apparatus and method of delivering highly volatile fuel and in its more specific aspects is a new and improved impeller for a fuel pump.

As aircraft become more developed, and higher altitudes and faster aircraft acceleration are being required, the problem of delivering fuel from the aircraft tanks to the aircraft engine becomes increasingly more difficult. Since the vapor pressure in high octane fuel used in aircraft is relatively high and the liquid fuel is subject to boiling or vaporization as the aircraft rises from a ground level to higher altitudes, where the surrounding air pressure becomes relatively low and possibly lower than the vapor pressure of the liquid fuel, formation of bubbles and vapor in the fuel tank render it exceedingly difficult to deliver fuel from the tank either in liquid form or in the form of a liquid vapor mixture having a low vapor content.

There have been numerous attempts to solve this difficult and well-known problem of delivering fuel under these adverse conditions and, to some extent at least, these undesirable conditions have been mitigated.

One of these attempts or approaches to the solution of the fuel delivery problem has been to pre-pressurize the fuel tank itself; however, this is considered dangerous and particularly undesirable especially in military aircraft.

Rather than pre-pressurize the fuel tank, another approach has been to provide the aircraft with what is known as a fuel booster pump. This booster pump heretofore usually has been some form of a centrifugal type pump mounted directly on the bottom of, or even submerged in, the aircraft fuel tank itself. It has been found in practice, however, that one of the difficulties in attempting to pump a mixture of liquid-vapor fuel from an aircraft tank is that the amount of gas or occluded vapor in the mixture has not been reduced sufficiently, and, unless the centrifugal type pump is provided with additional means to attempt to separate or reduce the amount of vapor from the mixture during or prior to the pumping operation, the pump will not function satisfactorily, and at times not at all, causing critical aircraft failure. One form of this vapor separating or reducing means additional to the centrifugal type booster pump itself can be an additional pump operated in tandem therewith to pre-pressurize the fuel as it enters the centrifugal pump, or in another form, the pump can be provided with agitator means, such as a fan, which will agitate the liquid-vapor mixture and separate or drive away the bubbles of gas and occluded vapor from the pump inlet. Still another form of addition to the centrifugal type booster pump is the provision of vapor traps or vapor collectors for separating and collecting the gas and occluded vapor from the fuel as it is being pumped. With this latter form, there is also provided a vapor removal means connected to the vapor trap to withdraw and communicate the collected vapor to the fuel tank.

It is evident that with the prior type systems, such as those described, many deficiencies ensue. Where it is necessary to provide a pre-pressurizing pump arrangement, it is naturally heavier and more expensive; where it is necessary to provide a fan to agitate the fuel, obviously a considerable portion of the fuel is returned to the tank and prevented from entering the pump inlet; and where the booster pump is provided with a vapor trap and removal means, several deficiencies have been found to exist, as for example, the vapor trapping means and vapor removal means will operate satisfactorily only within limited ranges with a centrifugal impeller and only within limited altitudes.

Accordingly, the above numerous attempts to solve the problem of delivering highly volatile fuel in aircraft have not been altogether satisfactory, particularly when the requirements of aircraft become more and more severe, and it is an object of my invention, in its broader aspects, to provide a solution to the problem of delivering this highly volatile fuel and overcome the deficiencies above mentioned.

Therefore, it is a general object of my invention to provide a booster pump which is highly efficient and better adapted to meet the increasingly more rigid requirements of the aircraft industry, that is, a booster pump which will efficiently deliver more fuel at higher temperatures, at higher altitudes and during faster aircraft acceleration.

Still another general object of my invention is to provide a new and highly efficient method of delivering fuel at higher temperatures, at higher altitudes and during faster aircraft acceleration.

Another object and accomplishment of my invention is to provide a new and improved fuel booster pump which will increase the rate of climb and altitude of present and future aircraft because of its ability to deliver fuel in liquid form or in a mixture form having the proper ratio of vapor to liquid to the aircraft engine under extremely adverse fuel temperatures, pressures and pump inlet conditions.

Another object and accomplishment of my invention is to provide a new and improved method of delivering fuel to an aircraft engine so that rate of climb and altitude of the aircraft can be increased.

In general, my invention, in one of the broad aspects can be described as a new and improved type fuel booster pump which can be arranged for mounting either upright or inverted, directly on the bottom of, submerged in, or on the side of any container full of fuel, more particularly a wing tank of an airplane, and wherein the fuel in the tank, being usually a mixture of liquid and vapor, can be pumped to an external or internal discharge line for ultimate use by an aircraft engine. The improved pumping ability of my invention is accomplished by so constructing and arranging an impeller to advantageously cooperate with the other elements of a booster pump assembly so that not only is the vapor-laden fuel drawn from the inlet and towards the discharge of the pump but also the vapor-laden fuel is, at the same time, subject to compression and condensation.

In general, too, my invention in another of its broad aspects briefly can be described as a new and improved method of delivering fuel comprising the steps of compressing the fuel in its liquid-vapor form without appreciably changing its temperature causing condensation of the vapor which accordingly lowers the vapor-to-liquid ratio of the mixture.

Briefly, this compression and condensation action of my invention either eliminates the vapor or reduces the vapor content of the liquid-vapor fuel to a point where it will not be detrimental to the operation of the booster pump or of an aircraft engine.

More specifically, by providing my impeller with a plurality of vanes or blades so positioned and proportioned to effectively cooperate with the liquid vapor fuel and so positioned and proportioned to define therebetween passages of diminishing cross-sectional areas at increasing distances from the axis of rotation from inlet to outlet so that the liquid-vapor mixture of fuel, as it is drawn in and forced through the pumping chamber, is also subject to continually increasing pressure and continual condensation which reduces the vapor content of the liquid-vapor mixture. How this reduction in vapor content of the liquid vapor mixture by continual compression and condensation is accomplished by my impeller will be more fully understood in the more detailed description thereof hereinafter.

It is important to note, however, at this point that one of the distinguishing features of my invention over prior booster pumps is that it is a mixed flow compression type pump which compresses the liquid-vapor mixture and causes a condensation action. Consequently, there is no need for additional means of pre-pressurizing the gas-laden fuel nor is there any need for providing my pump with additional vapor trapping means or vapor removal means as discussed aforesaid in order to deliver the fuel in its desired form to the aircraft engine.

Accordingly, my invention has for one of its goals the provision of an improved construction of a fuel booster pump of the mixed flow compression type incorporating a new and improved mode of coaction between the housing, the impeller and the fluid moved thereby, and for another of its goals the provision of a new method of pumping highly volatile fuel which reduces the vapor content of the fuel being moved.

A more particular object of my invention is the provision of an impeller in a booster pump specifically designed to provide a compression of the liquid-vapor mixture of fuel being pumped which results in a reduction of the vapor content of the fuel through compression and condensation.

A still more specific aspect of my invention is to provide an improved and novel pump impeller effective in cooperating with the wall of a pump housing to produce two forms of action upon the liquid-vapor mixture being handled, including first, a spiral movement from the inlet to the outlet of the pump causing flow from pump inlet to pump outlet, and secondly, a compression of the mixture and condensation of the vapors as the liquid-vapor is being moved in this spiral path.

Still another more particular object and accomplishment of my invention is the provision of a new and improved method of delivering fuel from a mixture having an initially high vapor content to a point of consumption where a low vapor content is required comprising the steps of compressing the mixture to reduce its vapor content without appreciably changing its temperature.

A still more specific accomplishment of my invention is to provide a new and improved pump impeller which will satisfy the more rigid requirements of aircraft and at the same time be sufficiently inexpensive to produce by mass production methods.

Other and more particular objects, advantages and uses of my invention will become more apparent from a reading of the specification taken in connection with the accompanying drawings which form a part thereof and wherein:

FIGURE 3 is a qualitative phase diagram for volatile liquid fuels showing a typical change of phase sequence of the fuel when acted upon by my invention;

FIGURE 4 is an elevational view of an impeller embodying the teachings of my invention in its preferred form and showing to advantage the shape and construction of the blades or vanes thereof;

FIGURE 5 is an enlarged detailed view of the leading edge of one of the blades of my impeller shown in FIGURE 4 showing to advantage its particular configuration;

FIGURE 6 is a plan view of my impeller shown in FIGURE 4 and showing to advantage the leading edges of the blades at the entrance of the impeller;

FIGURE 7 is an elevational view, partially broken away disclosing a booster pump assembly constructed in accordance with the teachings of my invention typically mounted on the bottom of a wing tank in an inverted position from that shown in FIGURE 1;

FIGURE 10 is a cross-sectional view of an impeller constructed in accordance with the teachings of my invention and similar to the impeller shown in FIGURE 4 but having a hollow core and mounted within a modified pump housing;

The drawings are to be understood to be more or less of a schematic character for the purpose of illustrating or disclosing a typical or preferred form in the drawings, like reference characters identify the same parts in the several views.

Figure 2:
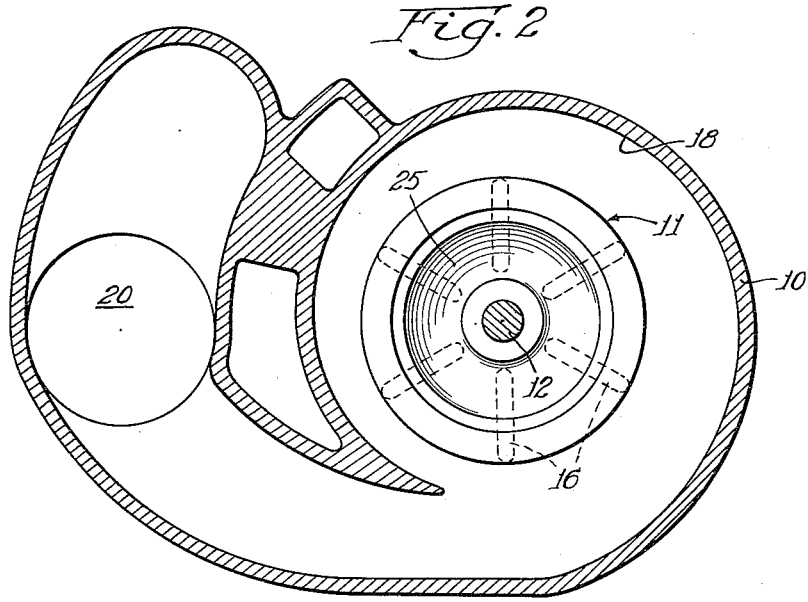
FIGURE 2 is a plan, sectional view, taken along lines 2—2 of FIGURE 1.
Figure 1:
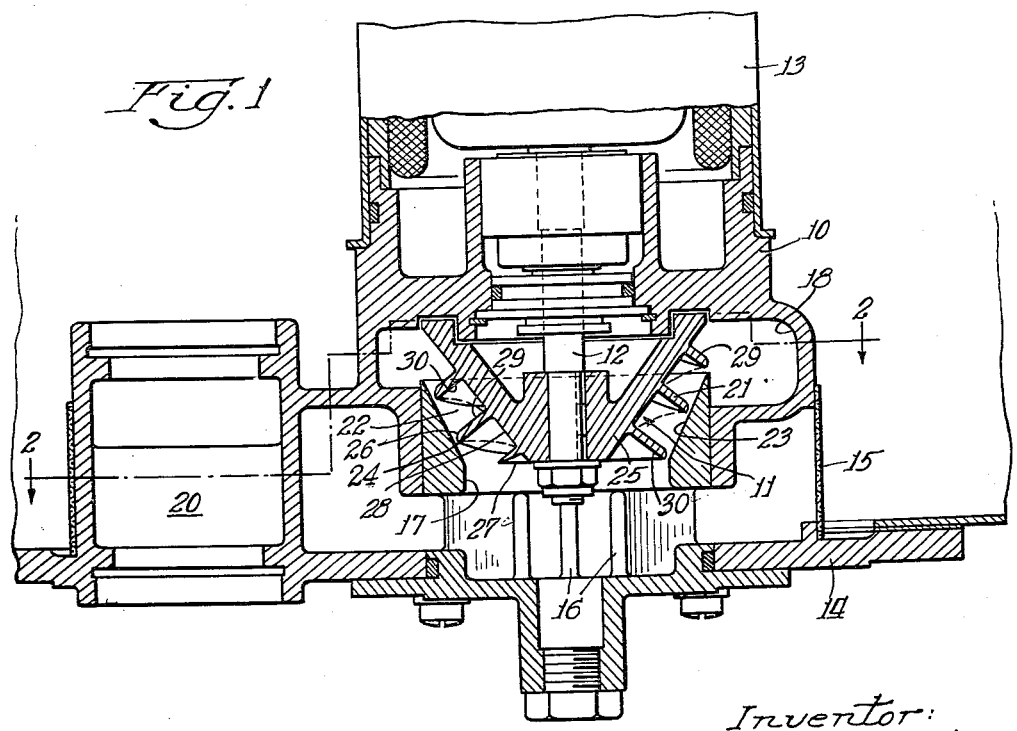
FIGURE 1 is an elevational view, partially broken away, disclosing a booster pump assembly constructed in accordance with my invention typically mounted submerged in a wing tank and further showing to advantage the preferred form of my impeller.

Referring in greater detail to the figures of the drawings, particularly the embodiment shown in FIGURES 1 and 2 thereof, there is shown a fuel booster pump assembly constructed in accordance with the teachings of my invention in its more comprehensive aspects exemplified in connection with a typical operative installation, that is, mounted submerged in an aircraft fuel tank on the bottom or lower side thereof. This booster pump assembly comprises generally a housing 10 having an impeller, indicated in its entirety by numeral 11, suitably affixed to the lower end of shaft 12 which, in turn, is rotatably driven in the usual manner by remotely controlled electric motor 13. When the booster pump assembly is operatively installed in the manner shown, the complete assembly is positioned by a mounting flange 14 specifically designed for that purpose to afford free gravity flow of liquid-vapor fuel from the tank to the impeller. Fuel entering the booster pump assembly from the tank, passes through the screen 15, mounted about the lower portion of the housing and moves at first radially inwardly then upwardly past inlet guide vanes 16 into inlet throat 17 to be discharged by the impeller 11 into the surrounding scroll or volute chamber 18. The scroll or volute chamber discharges into the usual outlet 20 which is arranged to be connected with an external or internal fuel line to a point of consumption (not shown).

The housing 10 with its inlet throat 17 is specially formed for cooperation with the specially formed spirally extending vanes 21 and channels or grooves 22 therebetween formed on the impeller 11. These spirally extending channels or grooves are given a smooth substantially rectangular contour, the open portions of these channels being in closely spaced relation to the conically formed wall surface 23 in the housing 10. The leading side 29 of the vanes 21 lie adjacent to or within the throat 17 and are formed to cooperate with the fuel entering the throat 17 in a manner fully explained hereinafter. When the impeller 11 is rotated it can be seen that the liquid-vapor mixture of fuel which enters the throat 17 is carried spirally upwardly and outwardly in the channels 22 to be discharged into the scroll 18 as aforesaid.

Referring now to the more specific aspect of my invention, namely, the provision of a new and improved impeller in a booster pump, attention is more particularly directed to FIGURE 1, where it can be seen that rotation of the impeller 11 by the shaft 12 in a counterclockwise direction will subject the liquid-vapor mixture in the throat 17 to the action of the leading edges 24 of the blades or vanes 21. It is important to note that as the fuel is being carried from the leading edges of the blades by the substantially rectangular grooves or passages 22, that the cross-sectional contour of the passages 22 becomes increasingly smaller presenting an increasingly diminishing area to the fuel flow so carried in such a manner that pressure is imposed upon the fuel in its spirally axial travel from the throat 17 until its discharge in the scroll 18. Particular attention is also directed, in the embodiment shown, to angular inclination of the cone-shaped hub 25 with respect to the rotational axis of the impeller as compared to the angular inclination of the cone-shaped side wall 23 of the housing with respect to this same axis. This shows very clearly the decrease in tolerance between the conical hub and the inclined wall 23 of the impeller chamber with resultant increase in pressure imposed upon the liquid or liquid-vapor being pumped. This increase in pressure imparts not only compression but also results in condensation of the vapors of the liquid-vapor mixture, as will be apparent in the more theoretical discussion of my invention hereinbelow.

Having thus described generally one of the broad aspects and the particular aspect of my invention to provide a working knowledge thereof, it would appear that one explanation of the improved performance of my invention over prior pumps of the conventional centrifugal type is based on the fact that my invention imparts not only a compression to the fuel being handled but also imparts a condensation of the vapor of the liquid-vapor mixture therein as aforesaid. To more particularly explain the action of my impeller on fuel being handled, attention is directed to FIGURE 3 where there is shown a qualitative pressure, volume, temperature phase diagram for volatile liquid fuels illustrating the fuel in three states—liquid, represented in the diagram by the portion or region L, liquid-vapor mixture represented by the region L—V, and gas represented by the region G. A study of this qualitative diagram shows that the highly volatile liquid fuel, such as that being handled by my invention, is represented as forming vapors at low pressure and elevated temperatures causing a change of phase in the fuel. Now in order to pump fuel in a liquid state or in the state of a mixture having the desired liquid-to-vapor ratio from an initial liquid vapor mixture, wherein the percentage of vapor in the mixture is unduly high, it is desirable that the impeller increase the pressure of the liquid-vapor mixture without appreciably changing its temperature. Thus, a new condition or state of the fuel caused by this increase in pressure without an appreciable change in temperature demands a reduction of the vapor content of the liquid-vapor mixture. In other words, in the process of changing the state of the fuel, the occluded vapors are compressed and the temperature of the fuel at this higher pressure has not increased appreciably; thus, the mixture is at a lower temperature value than that at which the initial ratio of vapor-to-liquid of the mixture can be maintained—an unstable condition whereby the vapor condenses to establish a new stable state of fuel.

The above described action of my impeller in changing the state of the fuel will continue to raise the pressure of the liquid vapor mixture without appreciably changing its temperature and a stable condition will continue to form by compression and condensation until the handled fuel is in the liquid region L or just within the liquid-vapor region L—V, as indicated in the diagram of FIGURE 3. Also, as the pressure of the fuel decreases with altitude the state of the fuel in the tank progresses toward or further into the liquid-vapor region L—V and the duty required of the impeller becomes more severe. This severity of duty will increase with higher altitudes until the vapor content of the liquid-vapor mixture has increased sufficiently within the blade passages of the impeller to cause mal-functioning and/or complete failure of the impeller to pump any fuel at all. In other words, my impeller, having the above described compression-condensation action near the inlet of the impeller or just within the blade passages, will continue until the pressure developed within the impeller is insufficient to place the state of the fuel in the liquid phase L or just within the liquid-vapor region L—V, as aforesaid. It is evident that my impeller would be designed to operate within the expected pressure temperature requirements before the mal-functioning or failure point is reached.

Turning now to FIGURE 3 of the drawings, to more particularly explain a fuel phase sequence in a typical operation when a fuel booster pump constructed in accordance with the teachings of my invention as incorporated in an airplane, there is shown an assumed temperature or initial state of the fuel during the filling of an aircraft tank indicated at A. In the event that the fuel in the tank becomes slightly heated, perhaps by the sun or some other means, the volume will increase to some point, such as B, with little change in pressure. Now as the fuel is being pumped at sea level a zone of low pressure forms at the inlet of the pump or near the leading edge of the impeller—point C indicating a point of lowest pressure in this zone. As the airplane rises in altitude the fuel starts to form vapor as indicated by the change from point C to C'—point C' being indicated at the pressure value at the lowest pressure point near the inlet of the pump. Note that there has been little or no change in temperature; the change, if any, being so small that it is indicated on the diagram as no change in temperature. As the aircraft continues to rise further, the pressure at the lowest pressure point in the impeller, i.e., at the inlet or near the leading edge of the blades, has decreased slightly and the fuel is in the liquid-vapor phase, as for example at C''. The fuel temperature has reduced slightly because of the vapor formation. At still higher altitude the pressure, taken at the same lowest pressure point with respect to the impeller, become sufficiently low for the temperature of the fuel at that pressure to cause excessive vapor formation even though the fuel has cooled a little by the rapid formation of vapor. This change in temperature and pressure will continue to follow this same pattern as the aircraft continues to rise, as for example, the changes shown at C''' and C''''. Points D, D', D'', D''' and D'''' indicate the pressure of the fuel within the blade passages and near the leading edge of the blades but at the end of the lowest pressure zone. It is important to note that the action of my impeller has increased the pressure of the fuel with no appreciable increase in its temperature (indicated as no change in temperature on the diagram) so as to place the state of the fuel in the liquid phase L or just within the liquid-vapor phase L—V where the amount of the vapor present is insufficient to seriously affect the functioning of the impeller, and the impeller will continue to act on the fuel to cause its change of phase at the inlet to the impeller or in the blade passages close to the inlet of the impeller where the liquid-vapor mixture will not interfere with the functioning of the impeller until the vapor content of the liquid-vapor mixture has increased sufficiently within the blade passages to cause mal-functioning. In other words, the main action of my impeller takes place at the inlet or within the blade passage near the leading edge of the blade and will properly function until it can keep the vapor content of the fuel sufficiently low within the blade passages to prevent mal-functioning.

It is to be noted that my invention has for one of its outstanding features an efficient and commercially practical design which will perform in accordance with the theoretical operation set forth above within expected fuel temperature and pressure characteristics, and which will embody certain other design features effective to cooperate advantageously with the fuel being pumped. Turning again to FIGURES 1, 4, 5 and 6, it can be seen that the impeller 11 having conically shaped hub 25 with blades 21 extending at right angles therefrom form substantially rectangular passages 22 as aforesaid. Attention is particularly directed, in this connection to the length and shape of the blades. The blades are long having a thin cross-sectional dimension and wind around the conically shaped hub 25 to form a spiral. These blades are spaced from each other so as to define passages 22 with gradually diminishing cross-sectional areas at increasing distances from the axis of rotation to provide aforesaid gradual compression and condensation on the fuel being pumped and are long with respect to the width of these cross-sectional areas to minimize the degree of vapor formation due to the blades themselves by keeping the reduction in pressure due to the flow over the blade surface at a minimum. The entire impeller spiral configuration thus formed results in an increase in pressure along the blade passages from the inlet to the discharge end of the impeller yet has an outstanding feature of restricting the point of lowest pressure development to the inlet or leading edge of the blades. Each vane or blade 21 has a leading side 29, a trailing side 30, and a rounded outer edge 26. The rounded outer edge 26 terminates in a substantially sharp edge 24 (see FIGURE 4) on the trailing side 30 of the blade and each blade has a portion of the heel 27 flattened near the inlet thereof such that the edge of the impeller is disposed in a radial plane at the inlet side thereof. The throat 17 of the pump assembly surrounds the impeller as shown in FIGURE 1 and cooperates with a considerable area of these leading edges 24 of blades 21 to permit the development and growth of a relatively large low pressure zone on each blade without it extending completely across the passage and deep into the passage. This cooperation allows the inlet area to the impeller itself to be rather large to reduce the velocity of the fuel entering the impeller in accordance with the well-known principle that if the velocity pressure of fluid under movement is increased, the static pressure goes down and may reach a point where the fluid will effervesce or boil. It is to be noted that the area of the throat 17 is relatively large to aid in keeping the velocity of the fluid low and minimize the reduction in pressure and vapor formation at the impeller inlet due to fluid velocity, and too, the blades present a flattened face to the throat 17 as shown in FIGURES 1, 4 and 6.

To allow more uniform pressure distribution across the impeller passages it is preferred that the impeller hub be conically shaped as shown in FIGURES 1, 4, 5 and 6 so that the root 28 of the passages 22 gradually increases its distance from the axis of rotation in order that the driving side faces 29 of the blades, being the area of greater pressure development tending to slow the flow of fluid, will not develop a pressure of a high enough magnitude to stop the flow of fluid completely or narrow the available passage of flow where it might again cause vapor to reappear. The under side faces 30 of the blades, being the area of lowest pressure due to flow alone, each having a mean radius greater than the radius of the driving side 29 will allow for more uniform pressure distribution. In other words, it is most desirable to have the pressure on the under side face 30 and the pressure adjacent the top side or driving side faces 29 of the blades to be uniform. This uniformity can be accomplished by decreasing the blade depth from inlet to outlet and by having the root 28 of the blade passage increase its distance from the center of rotation.

The decreasing blade depth from inlet to discharge as described aforesaid also creates a tendency toward back flow along the impeller shroud, as defined by surface 23, to the inlet of the impeller and creates an area, as aforesaid, at the inlet to the impeller within the eye, as defined as the throat 17 and the impeller inlet, which minimizes the tendency for vapor formation due to the high velocity. In other words, the gradually diminishing cross-sectional area of the passages chokes the flow of fluid slightly causing slippage of fluid along and around the heel of the blade from the leading side 29 to the trailing side 30 causing pressure to build up or to increase.

As it can be seen, my invention is an efficient and commercially practical design which efficiently cooperates with the fuel being handled to not only reduce any vapor formation which might be formed by the rotation and/or shape of the impeller itself, but also utilizes the flow and vapor characteristics of the fuel to give the invention its outstanding pumping ability, and it is understood by the proper selection of the blade shapes and sizes as disposed on a selected hub to cooperate with an adjacent side wall of a pump chamber according to the teachings of my invention, proper cooperation between the pump assembly and the fuel being handled will result. Obviously, too, the pitch of the blades can be varied and the impeller can be designed to rotate clockwise or counterclockwise, if desired.

In this latter connection, my invention can be said to have for one of its outstanding principles a cooperation with the fuel being handled as contrasted to prior type booster pumps which attempt not to cooperate with the fuel as found near the pump inlet but to separate vapors and the liquids insofar as possible, necessitating additional elements to the pump to obtain this separation.

It is evident, also, from the above description that my invention in another of its broad aspects comprises the steps of continued compression and condensation of an initial liquid-vapor mixture so that the vapor content of the fuel continually goes from a stable to an unstable and thence to a new stable condition in its travel to a final point of consumption.

Turning now to FIGURE 7, there is shown another arrangement of my invention, similar to that shown in FIGURES 1 and 2, except that the booster pump assembly is shown typically mounted in an inverted manner with the impeller and pumping chamber mounted below the tank level. Parts in the assembly shown in FIGURE 7 are numbered to correspond to similar parts shown in FIGURES 1 and 2. It is evident that fuel entering the screen 15 will flow by gravity past inlet guide vanes 16 and will be discharged into scroll 18 by the action of the impeller 11 according to the principles above discussed in connection with FIGURES 1 through 6. It is to be noted that this arrangement utilizes an impeller of the type shown in FIGURES 1 through 6.

Figure 8:
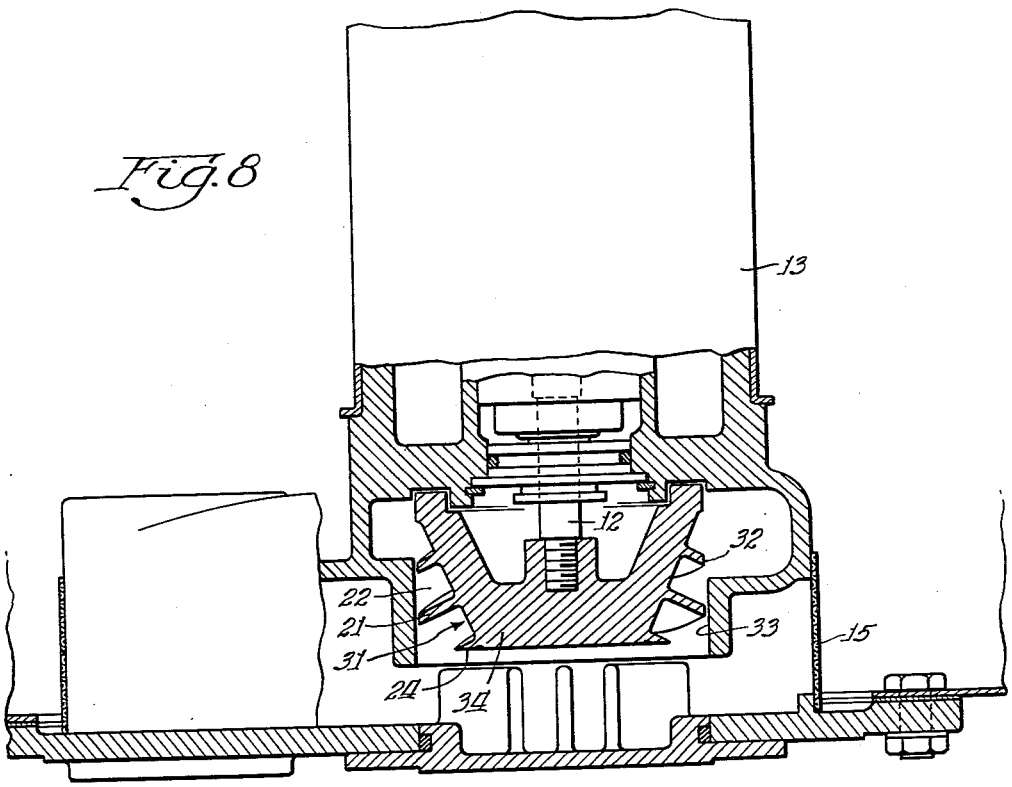
FIGURE 8 is an elevational view, partially broken away, of a booster pump assembly constructed in accordance with the teachings of my invention and showing to advantage another form of an impeller for use in a pumping chamber of substantially cylindrical form.

Attention is now directed to FIGURE 8 where there is shown an alternative embodiment of an impeller constructed according to my invention in its more particular aspects. It is to be noted that the outer periphery of my impeller, indicated in its entirety by 31 in this embodiment, is substantially cylindrical in form as indicated at 32 to advantageously cooperate with a substantially cylindrically formed pumping chamber 33. Particular attention is directed, however, to the angular conical inclination of hub 34 with respect to the cylindrical chamber 33 and the outer periphery 32 of the impeller. This angular inclination of the hub with respect to the cylindrical pumping chamber together with the blades 21 form passages 22 of increasingly diminishing cross-sectional areas at increasing distances from the axis of rotation to act upon the fuel being delivered in the manner described in connection with FIGURES 1 through 6. The leading edges 24 and the blade passages 22 perform the same function in this embodiment as they do in the embodiment shown in FIGURES 1 through 6 and it is to be further noted that the impeller is designed to contain the functional characteristics as aforesaid in connection with the impeller shown in FIGURES 1 through 6. In other words, the impeller 31 in FIGURE 8 properly cooperates with the fuel to cause compression and condensation action without appreciably changing its temperature and without appreciably increasing the vapor content of the fuel by the action of the impeller itself. Too, this impeller allows the development of a much larger low pressure zone adjacent its inlet which may be desirable for certain prescribed conditions.

Figure 9:
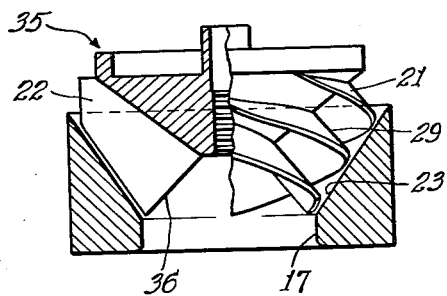
FIGURE 9 is an elevational view, partially broken away, of still another form of impeller constructed in accordance with the teachings of my invention, and disposed within the side walls of a pumping chamber and showing to advantage a modified leading edge formed on the blades at the entrance to the impeller.

Turning now to FIGURE 9 of the drawings there is shown still another alternative embodiment of my invention in its more particular aspects. It is to be noted that this impeller, indicated in its entirety as 35, has a conically shaped outer periphery formed by the blades 21 to define the increasingly diminishing passages 22 in a manner similar to the impeller shown in FIGURES 1 through 6. This impeller 35 is designed to cooperate with conically formed walls of a pumping chamber such as that shown in FIGURE 1 in a manner described aforesaid. This impeller, however, has as its particular feature, leading edges on its blades, as shown at 36, cut back at an angle to axis of rotation of the impeller so that the leading edges present an angular approach to the fuel being pumped different from the approach of leading edges 24 shown in FIGURE 1 when installed in a pump assembly such as that shown in FIGURE 1. It must be borne in mind that when impeller 35 is so installed, the conical pumping chamber and throat 17 covers the blade edges in somewhat the same manner that the chamber covers the blades of impeller 11 so that only the leading edges 36 and the driving side 29 of the blades bites into the fuel as it approaches the inlet to the impeller formed in the throat 17 of the pump. The leading edges 36 have been found to cooperate with the low pressure area formed in the fuel in a manner similar in the leading edges 24 of the impeller shown in FIGURE 1 and is well adapted to meet certain specific performance characteristics. In other words, it has been found that by varying the angle that the leading edge makes with the axis of rotation of my impeller, the other design characteristics of my impeller being the same, as above described in connection with FIGURE 1, the performance of my impeller can be varied to meet certain conditions. There is, of course, a limit on the angle that the leading edge can vary from the axis of rotation beyond which the efficiency of the impeller to operate according to the prescribed conditions will become reduced.

FIGURE 10 is still another alternative of my invention in its more particular aspects as shown in a semi-schematic partially broken away modified housing indicated in its entirety as 37. Particular attention is directed to the fact that this impeller, indicated in its entirety as 38, has a hollow conically-shaped hub 39 which will permit vapor from the inlet 17 to flow out through the passage 40 formed in the upper portion of the housing 37 to reduce the amount and the size of the vapor bubbles found in the impeller inlet. Hollow conical hub 39 is provided with arms or bars 41 which are suitably affixed to sleeve 42 for rotatably affixing the impeller 38 on shaft 12 in any convenient manner. It is to be noted that this impeller 38 has an action on the fluid being pumped in the same manner as that described in connections with FIGURES 1 through 6. Practice has shown, however, that this type of impeller with its hollow-shaped hub, while allowing the free rise of vapor and thus reducing the vapor content of the liquid-vapor mixture prior to the time it is acted upon by the blades, does not have an efficiency equal to the above discussed impeller and as shown in the FIGURES 1 through 9, can be used only in cases where power requirements are not too important.

While my invention in its broad and specific aspects has been disclosed in connection with certain specific embodiments thereof, it is to be understood that these are by way of examples rather than limitation, and that my invention is designed or comprehended within the appended claim which should be given a scope consistent with the prior art.

This is a continuation application of an earlier filed United States patent application Serial Number 466,562, filed November 3, 1954, entitled Liquid Vapor Pump, now abandoned.

I claim:

A pump assembly for delivering a mixture of liquid and vapor comprising a housing, means defining an impeller chamber within said housing, an inlet and an outlet for said impeller chamber, a conical hub within said chamber rotatable about the axis of said chamber, a plurality of relatively long and relatively flat vanes spirally wound around and disposed substantially normal to said conical hub having an outer free edge, said vanes extending at least one complete turn about said axis, said vanes having a high pressure side facing the base of said conical hub and a low pressure side facing the apex of said conical hub, the walls of said impeller chamber being conically shaped at an angle to the base thereof greater than the angle of said conical hub to define with said vanes and with said hub a plurality of passages of diminishing tolerance in a plane normal to said axis between said hub and said housing from said inlet to said outlet, the exposed portions of said vanes adjacent said inlet each being cutaway along a plane perpendicular to said axis intersecting said high pressure side and said low pressure side of said vane to provide a sharp exposed surface adjacent said inlet, said outer free edge of said vane being rounded from said high pressure side terminating in a substantially sharp edge on said low pressure side.

References Cited in the file of this patent
UNITED STATES PATENTS

| | | |
|---|---|---|
| 916,583 | Owen | Mar. 30, 1909 |
| 1,981,991 | Cline et al. | Nov. 27, 1934 |
| 2,845,870 | Lock | Aug. 5, 1958 |
| 2,845,871 | Compton | Aug. 5, 1958 |

FOREIGN PATENTS

| | | |
|---|---|---|
| 68,594 | Germany | May 10, 1893 |
| 556,342 | Italy | Feb. 5, 1957 |
| 783,468 | Great Britain | Sept. 25, 1957 |